UNITED STATES PATENT OFFICE.

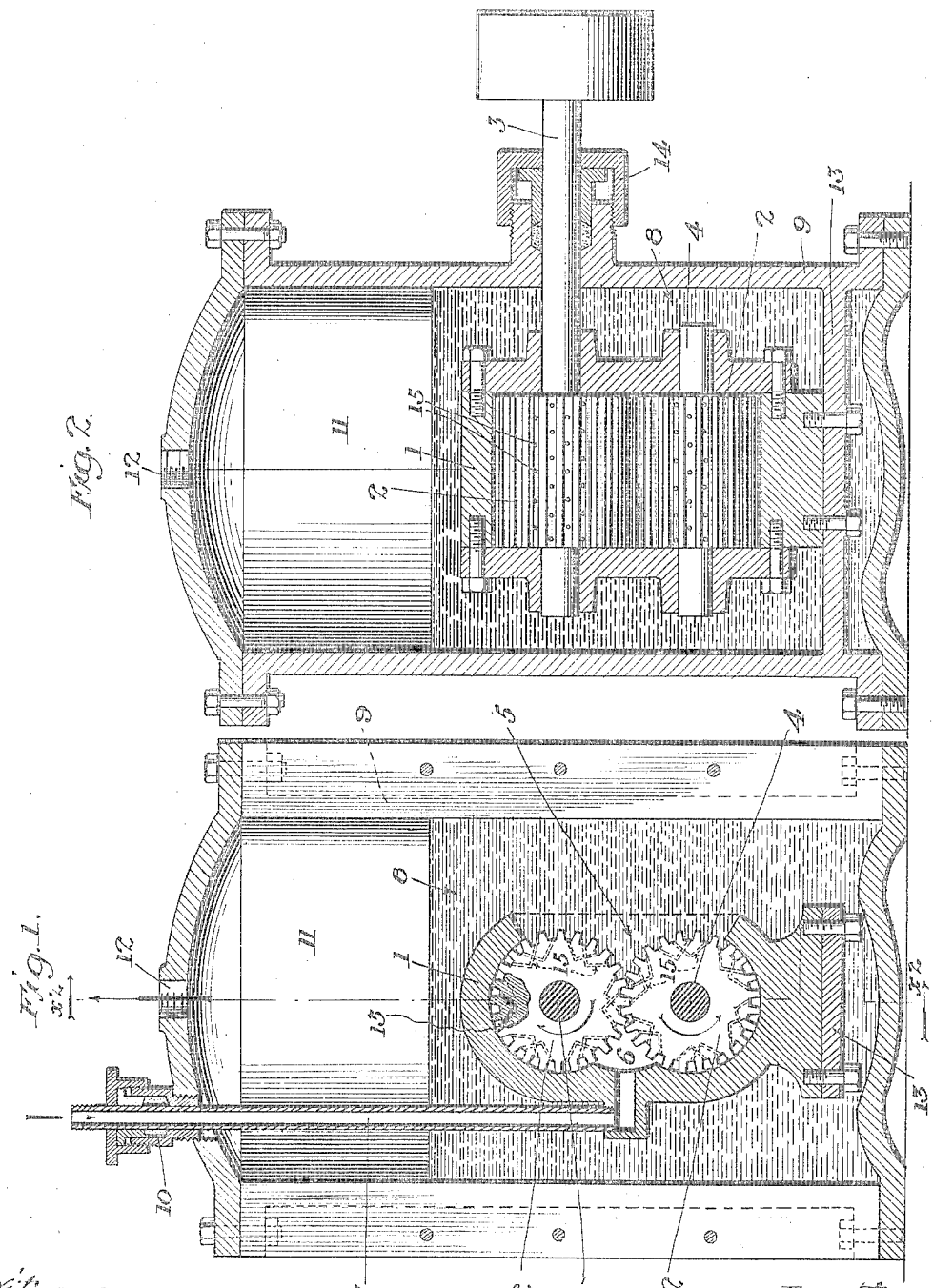

GEORGE I. LEONARD, OF LOS ANGELES, CALIFORNIA, ASSIGNOR, BY DIRECT AND MESNE ASSIGNMENTS, TO LEONARD ROTARY PUMP CORPORATION, OF LOS ANGELES, CALIFORNIA, A CORPORATION OF CALIFORNIA.

ROTARY PRESSURE OR VACUUM PUMP.

1,068,251. Specification of Letters Patent. Patented July 22, 1913.

Application filed September 25, 1911, Serial No. 651,282. Renewed April 28, 1913. Serial No. 764,260.

*To all whom it may concern:*

Be it known that I, GEORGE I. LEONARD, a citizen of the United States, residing at Los Angeles, in the county of Los Angeles and State of California, have invented a new and useful Rotary Pressure or Vacuum Pump, of which the following is a specification.

This invention relates to rotary pressure or vacuum pumps and the object of the invention is to provide a rotary pressure or vacuum pump by means of which a far greater pressure or vacuum may be produced than heretofore by any known rotary pump.

A further object is to prevent internal leakage in the pump.

A further object of the invention is to eliminate all valves and to attain efficiency of operation, simplicity and economy of construction and entire absence of reciprocating parts.

In carrying out my invention, I employ a pair of gears which mesh with each other and rotate in opposite directions, the gears being confined in a casing with an admission at one side and an exhaust at the other. I submerge these parts in a liquid, the liquid having access directly to the discharge side of the gears, but being excluded from the inlet side. The gears fit with a working fit within the casing and the liquid acts as a seal to prevent any leakage past the gears and prevents the passage of any gas from the inlet to the discharge, other than that which is carried in the spaces between the teeth of the gears.

Referring to the drawings: Figure 1 is a vertical cross section through the device. Fig. 2 is a section on line $x^2$—$x^2$ in Fig. 1.

In its preferred form the invention consists of a casing 1 within which are two gears 2 meshing with each other, and mounted on shafts 3 and 4 which are journaled in the sides of the casing 1. The casing 1 is cut away at one side to form a discharge opening 5 and an inlet port 6 opposite from the discharge opening 5, communicates with an inlet pipe 7. The foregoing elements are submerged in liquid 8, for example, oil, which acts to seal the spaces between the gears themselves and between the gears and the casing, the liquid coming in direct contact with the gears through the discharge opening 5. The casing excludes the liquid from the inlet side of the gears and the inlet passage 7 extends to a point above the level of the liquid 8.

The liquid is contained in a closed receptacle 9 through which the pipe 7 extends, with a packing joint 10, and a storage space 11 is formed within the receptacle 9 above the liquid 8. An outlet 12 is arranged in the receptacle 9, communicating with the storage space 11. The casing 1 is preferably bolted to a support 13 at the lower part of the receptacle 9 and the shaft 3 extends through a stuffing box 14 and may be driven in any desired manner.

In operation, the gears are rotated in the direction of the arrow, which produces a suction through the pipe 7 on account of the teeth of the gears removing all gas or liquid from within the space 6 and carrying it circumferentially around the outer peripheries of the gears, and discharging it into the opening 5 where the gas passes into the liquid 8 and rises therefrom into the space 11 at the top, the gas being lighter than the liquid 8. As the gears rotate, their teeth will close together, entrapping a certain quantity of liquid, so that as the teeth of the gears close together in mesh, this liquid thus entrapped would have to be compressed. As the speed of the closing movement of the teeth is greater than the speed at which the oil can escape, and as the liquid is virtually incompressible, I provide an escape for this entrapped liquid by drilling holes 15 from points between alternate spaces between teeth, the two holes from each alternate pair of spaces being drilled at such an angle, as clearly shown in Fig. 1, that the holes are close together and establish communication from a space when it is at a point of closest fit, with a point located directly in the body of liquid 8, so that the entrapped liquid is expelled through these holes 15 and returned to the main body of liquid 8. The comparatively slight amount of liquid which is carried through into the space 6 is immediately exhausted therefrom by the outwardly moving teeth of the gears and is carried around by the gears and returned into the main body of liquid 8, where the gas bubbles up through the liquid into the space 11.

When the machine is being used as a pump and the pressure within the space 11 increases, the pressure of the liquid 8 will, of course, be increased correspondingly, and the liquid will have a greater tendency to pass across the gears and between the gears into the space 6, but this may be compensated for by increasing the speed of the gears, so that the amount of liquid, even though slight, which creeps into the space 6 is immediately expelled therefrom.

In operating the machine as a vacuum pump, the pressure within the space 11 should not be greater than atmospheric pressure, the storage chamber 11 not being required for operating the machine as a vacuum pump.

What I claim is:

1. A rotary pressure or vacuum pump, comprising a casing, a pair of gears meshing with each other in said casing, an inlet pipe communicating with the interior of the casing at one side of the gears, the other side of the casing having a discharge opening, and liquid in said discharge opening sealing all spaces, and means permitting liquid to escape from a space between teeth to a relatively unlimited space.

2. A rotary pressure or vacuum pump, comprising a casing, a pair of gears meshing with each other in said casing, an inlet pipe communicating with the interior of the casing at one side of the gears, the other side of the casing having a discharge opening, and liquid in said discharge opening sealing all spaces, the gears having passages leading from spaces between teeth to other points of the gears close to said spaces whereby liquid can escape from between teeth which are in mesh to a relatively unlimited space.

In testimony whereof, I have hereunto set my hand at Los Angeles, California, this 18th day of September, 1911.

GEORGE I. LEONARD.

In presence of—
G. T. HACKLEY,
GLADYS RUSSELL.